(12) United States Patent
Zhang

(10) Patent No.: US 12,393,588 B2
(45) Date of Patent: Aug. 19, 2025

(54) ORDER SEARCHING METHOD, APPARATUS, COMPUTER DEVICE, AND STORAGE MEDIUM

(71) Applicant: Beijing Zitiao Network Technology Co., Ltd., Beijing (CN)

(72) Inventor: Weidong Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 44 days.

(21) Appl. No.: 18/470,349

(22) Filed: Sep. 19, 2023

(65) Prior Publication Data

US 2024/0134860 A1 Apr. 25, 2024
US 2024/0232200 A9 Jul. 11, 2024

(30) Foreign Application Priority Data

Oct. 24, 2022 (CN) .......................... 202211300110.0

(51) Int. Cl.
  *G06F 16/245* (2019.01)
  *G06F 16/2455* (2019.01)
  *G06F 40/279* (2020.01)
  *G06Q 30/0601* (2023.01)

(52) U.S. Cl.
  CPC ........ *G06F 16/2455* (2019.01); *G06F 40/279* (2020.01); *G06Q 30/0635* (2013.01)

(58) Field of Classification Search
  None
  See application file for complete search history.

(56) References Cited

U.S. PATENT DOCUMENTS

| | | | |
|---|---|---|---|
| 9,692,738 B1 * | 6/2017 | Wenneman | G06F 16/24 |
| 10,469,665 B1 * | 11/2019 | Bell | G06F 16/90 |
| 2006/0253393 A1 * | 11/2006 | Bean | G06F 16/2455 |
| 2009/0144109 A1 * | 6/2009 | Knight | G06F 16/53 |
| 2018/0089781 A1 * | 3/2018 | Landrum | G06F 16/245 |
| 2020/0034791 A1 * | 1/2020 | Lee | G06F 16/24522 |
| 2022/0036298 A1 * | 2/2022 | Manggala | G06F 16/35 |
| 2023/0360232 A1 * | 11/2023 | Kocamaz | G06F 16/22 |

FOREIGN PATENT DOCUMENTS

CN 113222506 A 8/2021

* cited by examiner

*Primary Examiner* — Son T Hoang
(74) *Attorney, Agent, or Firm* — Alleman Hall & Tuttle LLP

(57) ABSTRACT

Input search information comprising keyword information representing an intention of an order query is obtained; and order data matching the search information is queried based on a transaction database and a logistics database. The transaction database comprises order data stored during order generation, and the logistics database comprises dynamically obtained logistics data of an order. The transaction data and the logistics data have a same order identifier for a same order. The queried order data is presented.

17 Claims, 8 Drawing Sheets

---

S101 — OBTAIN INPUT SEARCH INFORMATION COMPRISING KEYWORD INFORMATION REPRESENTING AN INTENTION OF AN ORDER QUERY

S102 — QUERY ORDER DATA MATCHING THE SEARCH INFORMATION BASED ON A TRANSACTION DATABASE AND A LOGISTICS DATABASE, WHEREIN THE TRANSACTION DATABASE COMPRISES ORDER DATA STORED DURING ORDER GENERATION, AND THE LOGISTICS DATABASE COMPRISES DYNAMICALLY OBTAINED LOGISTICS DATA OF AN ORDER; THE TRANSACTION DATA AND THE LOGISTICS DATA HAVING A SAME ORDER IDENTIFIER FOR A SAME ORDER

S103 — PRESENT THE QUERIED ORDER DATA

ORDER SEARCHING METHOD, APPARATUS, COMPUTER DEVICE, AND STORAGE MEDIUM

CROSS REFERENCE TO RELATED APPLICATIONS

The present application claims priority to Chinese Patent Application No. 202211300110.0, titled "AN ORDER SEARCHING METHOD, APPARATUS, COMPUTER DEVICE, AND STORAGE MEDIUM," filed on Oct. 24, 2022, the contents of which are hereby incorporated by reference in its entirety.

FIELD

Embodiments of the present disclosure generally relate to computer technology, and in particular to an order searching method, apparatus, computer device, and storage medium.

BACKGROUND

With the rapid development of e-commerce technology, online shopping has brought great convenience to life of people. When people have shopping needs, online shopping has gradually become a priority shopping way. For respective orders generated during online shopping, a user may have a need to search for an order, no matter a completed order or an order in progress. However, conventional order searching schemes have problems with low recall rates and inaccurate recalls.

SUMMARY

The embodiments of the present disclosure provide at least an order searching method, apparatus, computer device, and storage medium.

In a first aspect of the present disclosure, an order searching method is provided, and the method comprises:
  obtaining input search information comprising keyword information representing an intention of an order query;
  querying order data matching the search information based on a transaction database and a logistics database, wherein the transaction database comprises order data stored during order generation, and the logistics database comprises dynamically obtained logistics data of an order; the transaction data and the logistics data having a same order identifier for a same order;
  presenting the queried order data.

In a possible embodiment, the logistics database is maintained by:
  segmenting, for each order, the dynamically obtained logistics data of the order, to obtain logistics description information and logistics tracking number information of the order;
  extracting a target entity word identifying a logistics service provider from the logistics description information;
  extracting an alphabetic identifier and a numerical number from the logistics tracking number information, and combining, according to a predetermined position sorting rule, the alphabetic identifier and the numerical number to obtain a target logistics tracking number;
  storing, in the logistics database, the target entity word, the target logistics tracking number, and the order identifier of the order as maintained logistics data.

In a possible embodiment, the querying order data matching the search information based on a transaction database and a logistics database comprises:
  segmenting the search information to obtain at least one search term corresponding to the search information;
  traversing each of the at least one search term to select a target search term related to logistics data from the at least one search term;
  querying, according to the target search term, a target logistics tracking number corresponding to the search information from the logistics database, and determining a target order identifier matching the target logistics tracking number;
  querying, from the transaction database, order data matching the target order identifier.

In a possible embodiment, the presenting the queried order data comprises:
  determining, according to an order status of the order corresponding to the queried order data, target order data to be presented, wherein different order statuses correspond to different presented target order data;
  presenting the target order data.

In a possible embodiment, the order status comprises a return and exchange status;
  the determining, according to an order status of the order corresponding to the queried order data, target order data to be presented comprising:
  in a case where an order status of the order is a return and exchange status, obtaining a return and exchange logistics tracking number from the order data, and obtaining, from the logistics database, logistics status information corresponding to the return and exchange logistics tracking number;
  presenting the return and exchange logistics tracking number and the logistics status information.

In a possible embodiment, the querying order data matching the search information based on a transaction database and a logistics database comprises:
  in accordance with a determination that a plurality of target logistics tracking numbers matching the search information exist in the logistics database, determining target order identifiers corresponding to the plurality of target logistics tracking numbers;
  querying, from the transaction database, respective order data matching each target order identifier;
  the presenting the queried order data comprising:
  sorting and presenting the plurality of queried order data, or presenting selected order data among the plurality of queried order data.

In a possible embodiment, the sorting and presenting the plurality of queried order data comprises:
  sorting and presenting, according to an order generation time corresponding to the respective queried order data, the respective queried order data; or,
  sorting and presenting the respective queried order data according to a matching degree between the target search term and the target logistics tracking number corresponding to the respective queried order data.

In a possible embodiment, the presenting selected order data among the plurality of queried order data comprises:
  presenting respective product category information corresponding to the plurality of order data;
  presenting, in a search result, order data matching the target product category information according to selected target product category information from the plurality of product category information.

In a second aspect of the present disclosure, an order searching apparatus is proposed, and the apparatus comprises:

an obtaining module configured to obtain input search information comprising keyword information representing an intention of an order query;

a querying module configured to query order data matching the search information based on a transaction database and a logistics database, wherein the transaction database comprises order data stored during order generation, and the logistics database comprises dynamically obtained logistics data of an order; the transaction data and the logistics data having a same order identifier for a same order;

a presenting module configured to present the queried order data.

In a third aspect of the present disclosure, a computer device is provided, and the computer device comprises a processor and a memory storing machine readable instructions executable by the processor, the machine-readable instructions, when executed by the processor, causing the processor to perform the first aspect or any step of any possible embodiment of the first aspect.

In a fourth aspect, a computer-readable storage medium is provided, and the computer-readable storage has a computer program stored thereon which, when executed by a computer device, performs the first aspect or any step of any possible embodiment of the first aspect.

The description of effectiveness of the order searching apparatus, computer device, and computer-readable storage medium may refer to the description of the aforementioned order searching method, and will not be repeated here.

The order searching method, apparatus, computer device, and storage medium provided in the embodiments of the present disclosure may achieve order data searching using two different databases and an order identifier after receiving search information by maintaining a transaction database including order data and a logistics database including logistics data, and associating the two databases using order identifiers, thereby improving an order recall rate; utilize the logistics database that comprises the logistics data for order searching, and the introduction of the logistics data facilitates accurate matching of order data that matches the search information according to courier information and the order identifier in the logistics data, thereby improving the accuracy of recalled order data.

In order to make the above objectives, features, and advantages of the present disclosure more apparent and understandable, the following provides preferred embodiments and a detailed explanation as follows in combination with accompanying drawings.

BRIEF DESCRIPTION OF THE DRAWINGS

In order to illustrate the technical solutions of the embodiments of the disclosure more clearly, the drawings required in the embodiments will be briefly described below. The accompanying drawings are incorporated in and form a part of the specification. These drawings illustrate embodiments that consistent with the present disclosure and are used together with the specification to illustrate the technical solution of the present disclosure. It is to be understood that the following drawings illustrate only certain embodiments of the present disclosure and thus cannot be considered as the limitation on its scope. Those of ordinary skill in the art may also derive other related drawings from these drawings without inventive work.

DETAILED DESCRIPTION

Figure 1:
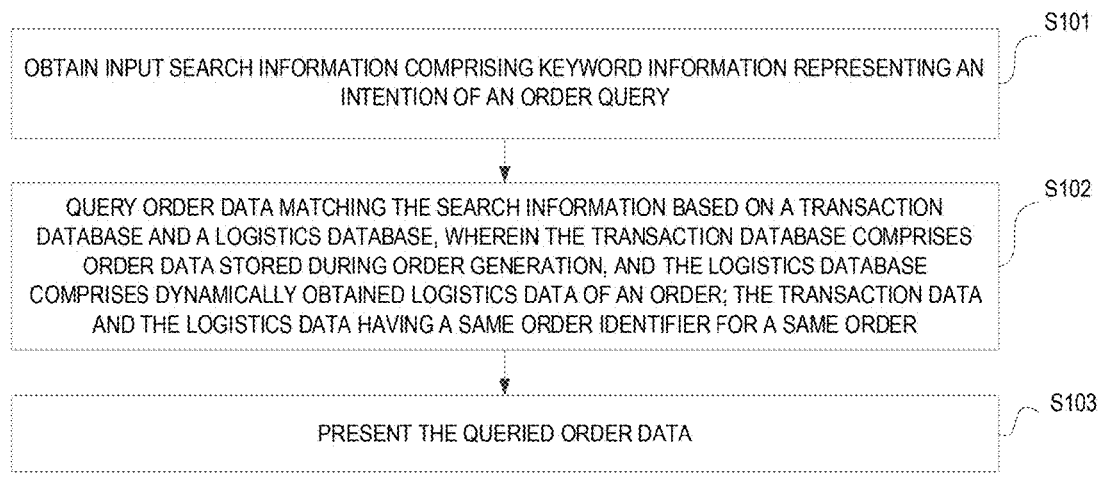
FIG. 1 shows a flowchart of an order searching method provided in the embodiments of the present disclosure.

To make the objectives, technical solutions and advantages of the embodiments of the present disclosure more apparent, the technical solutions in the embodiments of the disclosure will be described clearly and completely with reference to the drawings in the embodiments of the present disclosure, and it is obvious that the described embodiments are only part of the embodiments of the disclosure, not all of the embodiments. The components of the embodiments of the disclosure, as generally described and illustrated in the drawings herein, can be arranged and designed in a wide variety of different configurations. Thus, the following detailed description of the embodiments of the disclosure, provided in the drawings, is not intended to limit the scope of the disclosure, as claimed, but is merely representative of selected embodiments of the present disclosure. All other embodiments, which can be derived by those skilled in the art from the embodiments of the disclosure without inventive work, shall fall within the protection scope of the present disclosure.

Furthermore, the terms "first," "second", and the like in the specification and claims of the embodiments of the disclosure and in the above drawings are used for distinguishing between similar elements and not necessarily for describing a particular sequential or chronological order. It will be appreciated that the data so used may be interchanged under appropriate circumstances such that the embodiments described herein may be implemented in other sequences than those illustrated or described herein.

"A plurality of or multiple" mentioned herein means two or more. "And/or" describes the association relationship of associated objects, indicating that there may be three relationships, for example, A and/or B, which may indicate: A exists alone, A and B exist simultaneously, and B exists alone. The character "/" generally indicates that the associated objects are in an "or" relationship.

Through research, it has been found that order searching serves as a method for users to obtain order data, and searching efficiency and the accuracy of a search result of order searching affects user experience. Most conventional search methods are based on a product name, a store name input by a user, or the like, but this method has problems of low recall rate and inaccurate recall.

Based on the aforementioned research, an order searching scheme provided in the present disclosure may achieve order data searching using two different databases and an order identifier after receiving search information by maintaining a transaction database including order data and a logistics database including logistics data, and associating the two databases using order identifiers, thereby improving an order recall rate; utilize the logistics database that comprises the logistics data for order searching, and the introduction of the logistics data facilitates accurate matching of order data that matches the search information according to courier information and the order identifier in the logistics data, thereby improving the accuracy of recalled order data.

The above drawbacks are the results obtained by practice and careful study of the inventor, and therefore, the discovery process of the above drawbacks and the solutions for the drawbacks proposed by the disclosure hereinafter should be the contribution of the inventor to the present disclosure.

It should be noted that similar labels and alphabets represent similar items in the accompanying drawings below, so that once an item is defined in one accompanying drawing, it does not need to be further defined and explained in the subsequent accompanying drawings.

To facilitate understanding of the embodiments, an order searching method disclosed in the embodiments of the present disclosure is described in detail. An execution subject of the order searching method provided in the embodiments of the present disclosure is generally a terminal device or other processing device with certain computing capability, and the terminal device may be a user equipment (UE), a mobile device, a user terminal, a terminal, a Personal Digital Assistant (PDA), a handheld device, a computer device, or the like; In some possible implementations, the order searching method may be implemented by calling computer-readable instructions stored in a memory through a processor.

The following is an example of the order searching method provided by the embodiments of the present disclosure, taking the execution subject as a computer device.

As shown in FIG. 1, a flowchart of an order searching method provided in the present embodiments of the present disclosure may comprise the following steps:

S101: obtaining input search information comprising keyword information representing an intention of an order query.

Here, the search information may be a searching query with a length of any character input by a user in any searching scenario. For example, order query information input in an order querying scenario (such as an order name, an order logistics tracking number, a product name, or the like); image query information input in an image searching scenario (such as an image name, an image format, or the like); any query keyword information input in a web searching scenario. The embodiments of the present disclosure do not provide specific limitations regarding specific searching scenarios and search information.

Taking an order querying scenario as an example, the search information may comprise the keyword information representing the intention of the order query. Specifically, the search information may comprise but is not limited to keyword information that represents its relevance to logistics, and keyword information related to product attributes such as a product name and/or a store name, and the keyword information may be all or part of characters representing a logistics tracking number (such as an express tracking number), and information of the name of a logistics service provider (such as the name of a courier). The search information may be information input by a user on an order querying page, and the order querying page is a page that supports the user to query and view an order.

For example, the search information may be shipping SMS information input by a user, for example, "Your goods have been delivered to XX Express for transportation. Wish you a pleasant shopping experience; or the search information may be a delivery reminder information input by a user, for example, "XX Express Reminder, your package (tracking number: xxxxxxxx) has arrived at XXX. Please pay attention to the call and sign for it in a timely manner. Wish you a happy life!"; or the search information may be customer service communication information input by a user, for example, "Dear, I have already shipped the goods to you, and this is the logistics tracking number XXXXX. Please remember to check it and feel free to contact us if you have any questions in the future."; or the search information may be a name of a logistics service provider and/or a logistics tracking number input by a user directly. The specific search information in the embodiments of the present disclosure is not subject to specific limitations, but it should be understood that any information input by a user for searching the order data should fall within the protection scope of the present disclosure.

The search information input by a user may be represented by a query. As an example, a user may input a query for querying the order data on an order searching page at any time.

S102: querying order data matching the search information based on a transaction database and a logistics database, wherein the transaction database comprises order data stored during order generation, and the logistics database comprises dynamically obtained logistics data of an order; the transaction data and the logistics data having a same order identifier for a same order.

Here, the transaction database may comprise order data and order identifiers of respective orders that have already been generated. The order identifier corresponding to an order is used to identify the order uniquely. Different orders may correspond to different users, and a user may correspond to one or more orders. order data and an order identifier corresponding to an order in the transaction database may exist association. The order data, for example, may comprise information such as order payment time, a product name, a store name, purchase quantity, product introduction information, a product image/video, order amount, a payment method, a return and exchange logistics tracking number, an order status, or the like. The specific order data in the embodiments of the present disclosure is not limited specifically, however information related to the order should all fall within the protection scope of the present disclosure.

The logistics database may comprise logistics data and order identifiers corresponding to respective generated orders. Logistics data and an order identifier corresponding to an order in the logistics database may exist association. The logistics data may comprise, for example, logistics status information, product attribute information corresponding to an order, a logistics service provider, a logistics transportation location, a target logistics tracking number, shipping information, return and exchange information, a shipping address, a recipient name, a shipper name, a product matching personnel name, contact information, or the like. The product attribute information may comprise but is not limited to a store name, a product name, a product introduction, product description information, and product function information. The specific logistics data in the embodiments of the present disclosure is not subject to specific limitations, however information related to logistics should all fall within the scope of protection of the present disclosure. The logistics data for any order may be dynamically obtained in real-time.

The logistics database and the transaction database may be associated through order identifiers. The logistics database and an order database have a same order identifier for a same order. For example, only for order X with order identifier XXX, the logistics database stores the order identifier XXX of the order X and logistics data of the order X, and the transaction database stores the order identifier XXX of the order X and order data of the order X.

When order data that matches the search information is queried, the queried order data may comprise one or more.

In a specific implementation of S102, after obtaining the search information, target logistics data that matches the keyword information may be first queried from the logistics database according to the keyword information in the search information. Then, the target order identifier may be determined according to the association corresponding to the target logistics data, and the order data that matches the target order identifier may be queried from the transaction database using the order identifier.

In addition, if order data that matches the search information is not determined using the transaction database and the logistics database, a null value or predetermined feedback information may be returned. For example, the predetermined feedback information may be "no relevant orders were found, please enter valid search information to search again".

In another implementation, for S102, there may be two matching links, one is a transaction database matching link, and the other is a logistics database matching link. The two matching links may be executed in parallel. Specifically, for the obtained search information, the order data may be queried, according to the transaction database matching link, in the transaction database according to information related to the search information and the product attribute and the order data in the transaction database, to determine whether there is order data matching the search information in the transaction database. For example, order data that matches a product name is searched from the transaction database according to the product name in the search information. At the same time, logistics data may be queried, according to the logistics database matching link, in the logistics database according to information related to logistics in the search information and logistics data dynamically obtained in the logistics database, to determine whether there is target logistics data matching the search information in the logistics database. For example, whether there is logistics data in the logistics database that matches the search information is determined according to the express tracking number information or the name of the courier. If there is logistics data in the logistics database that matches the search information, the order data that matches the search information may be queried from the transaction database according to the target order identifier corresponding to the matched logistics data.

Finally, both the order data that matches the search information determined using the transaction database, and the order data that matches the search information determined using both the logistics database and the transaction database, may be served as the order data that matches the search information.

In one embodiment, the logistics database may be maintained by:

Step 1: segmenting, for each order, the dynamically obtained logistics data of the order, to obtain logistics description information and logistics tracking number information of the order.

Here, the logistics description information may refer to information related to the name of the logistics service provider in the logistics data, for example, XX Express, XX Express delivery, XX fresh food, or the like. The logistics tracking number information may be the express tracking number information in the logistics data, such as SFXXXXX, EMSXXXXXXX, or the like.

In a specific implementation, for each order, data that is not related to product transportation may be selected first in the dynamically obtained logistics data of the order, thereby obtaining the courier information in the logistics information. Then, the courier information is segmented to obtain the logistics description information and the logistics tracking number information of the order.

Step 2: extracting a target entity word identifying a logistics service provider from the logistics description information.

Here, the target entity word identifying the logistics service provider may be an entity name of the logistics service provider. For example, the target entity word may be "XX" in XX Express, "YY" in YY Express delivery, or "ZZ" in AZ fresh food.

As an example, for the logistics description information of each order, the target entity word that identifies the logistics service provider may be determined and extracted.

Step 3: extracting an alphabetic identifier and a numerical number from the logistics tracking number information, and combining, according to a predetermined position sorting rule, the alphabetic identifier and the numerical number to obtain a target logistics tracking number.

Here, conventional logistics tracking information may generally comprise an alphabetic identifier used for identifying the logistics service provider and a numerical number used for uniquely identifying the order logistics. For example, the logistics tracking number information may be SFYYYYYY, EMSZZZZZZ, or the like. The predetermined position sorting rule is used to indicate a positional order of the alphabetic identifier and the numerical number. For example, the predetermined position sorting rule may be (the alphabetical identifier, the numerical number).

Taking the logistics tracking number information as SFYYYYYY as an example, the alphabetic identifier "SF" and the numerical number "YYYYYY" may be extracted from the logistics tracking number information firstly. Then, the target logistics tracking number in a form of (SF, YYYYYY) may be obtained by combining according to the predetermined position sorting rule.

Alternatively, after extracting the alphabetic identifier and the numerical number from the logistics tracking number information, the logistics tracking number information may be directly used as the target logistics tracking number.

Step 4: storing, in the logistics database, the target entity word, the target logistics tracking number, and the order identifier of the order as maintained logistics data.

During a specific implementation, for each order, the target entity word, the target logistics tracking number, and the order identifier of the order determined from the logistics data corresponding to the order may be stored as the maintained logistics data in the logistics database. In this way, the amount of data storage and maintenance difficulty of the logistics database may be reduced by maintaining the logistics database through the target entity word, the target logistics tracking number, and the order identifier.

It should be noted that since an order may have one or more products, and different products may be transported in batches, an order may correspond to at least one existing maintained logistics data.

Figure 2:
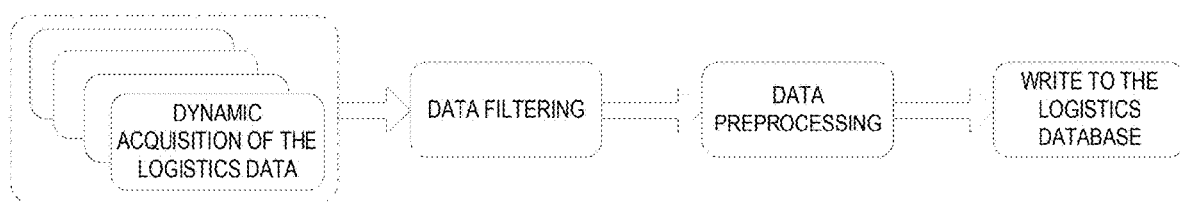
FIG. 2 shows a schematic diagram of maintenance of a logistics database provided in the embodiments of the present disclosure.

As shown in FIG. 2, a schematic diagram of maintenance of a logistics database is provided in the embodiments of the present disclosure, which may comprise the following four steps: step 1: dynamic acquisition of the logistics data, that is, acquiring the logistics data of the order dynamically; step 2: data filtering, that is, filtering out data unrelated to product transportation in the logistics data; step 3: data preprocessing, that is, performing the aforementioned step 2 and step 3; step 4: writing to the logistics database, that is, storing, in the logistics database, the target entity word, the target logistics tracking number, and the order identifier of the order as maintained logistics data.

In one embodiment, S102 may be implemented as follows:

S102-1: segmenting the search information to obtain at least one search term corresponding to the search information.

As an example, a deep model may be used to segment the search information, to obtain at least one search term corresponding to the search information. The search term may comprise but is not limited to the keyword information, and the deep model may comprise multiple sub-models with a set processing order. For example, multiple sub-models may be BERT model+BiLSTM model+CRF model that are executed sequentially. The Bidirectional Encoder Representations From Transformer (BERT) model from a converter is a pre-trained language representation model which may generate deep bidirectional language representations. Bidirectional Long Short-Term Memory (BiLSTM) model is a model for processing text information. Conditional Random field (CRF) is a basic model in Natural Language Processing and is widely used in word segmentation.

S102-2: traversing each of the at least one search term to select a target search term related to logistics data from the at least one search term.

Here, the target search term refers to a search term related to the logistics data (for example, express delivery), such as a name identifying the logistics service provider, a logistics tracking number, or the like.

As an example, the search information input by a user is "The product "XXXX" you purchased has been delivered to XX Express for transportation, with the tracking number YYYYYY Wish you a pleasant shopping experience! [XXX flagship store]". "You", "purchased", "product "XXXX"", "delivered", "XX Express", "transportation", "tracking number", "YYYYYY", "wish you a pleasant shopping experience", "XXX flagship store" and so on may be obtained by using S102-1 to segment the search information. Afterwards, it may be determined that target search terms related to the logistics data that comprise "XX Express" and "YYYYYY" by traversing the search terms.

Alternatively, in a case where the determined target search term comprises a search term related to the logistics tracking number information, and the target search term comprises an alphabetic identifier and a numerical number, the target search term may be adjusted to a target search term with the predetermined position sorting rule according to the aforementioned step 3. Similarly, in a case where the determined target search term comprises a search term related to the logistics description information, a target entity word identifying the logistics service provider may be selected from target search terms according to the aforementioned step 2, and the target search term may be updated to the selected target entity word.

S102-3: querying, according to the target search term, a target logistics tracking number corresponding to the search information from the logistics database, and determining a target order identifier matching the target logistics tracking number.

During a specific implementation, the target logistics tracking number that matches the target search term may be queried from respective target entity words and respective target logistics tracking numbers maintained in the logistics database. Then, the target order identifier that matches the target logistics tracking number may be determined according to the association between the respective target entity words, the respective target logistics tracking number and the order identifier maintained in the logistics database, and the target order identifier is served as the target order identifier that matches the search information.

S102-4: querying, from the transaction database, order data matching the target order identifier.

As an example, after determining the target order identifier that matches the search information, the order data and the order identifier maintained in the associated transaction database may be used to query the order identifier that matches the target order identifier from the transaction database, and the order data associated with the order identifier may be served as the order data that matches the target order identifier, that is the order data that matches the search information is obtained.

S103: presenting the queried order data.

As an example, the queried order data may be presented sequentially on the order querying page, and recommended product information related to the queried order data may also be presented on the order querying page.

Figure 3:
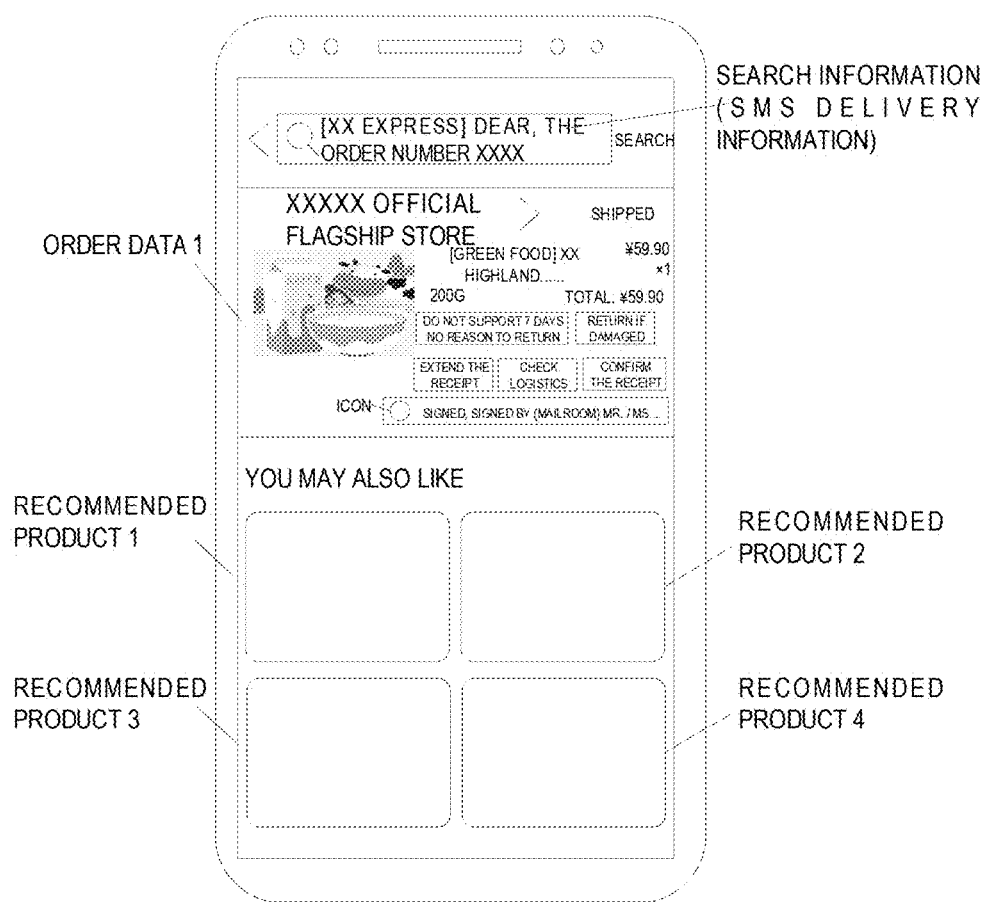
FIG. 3 shows a schematic diagram for presenting queried order data provided in the embodiments of the present disclosure.

As shown in FIG. 3, a schematic diagram for presenting the queried order data according to the embodiments of the present disclosure is provided. The search information input by a user may be SMS delivery information, for example, "[XX Express] Dear, the order number XXXXXXXXX has started shipping! Supervision phone number: XXXXXXX". After obtaining the search information, the order searching method provided in the embodiments of the present disclosure may be used to generate an order querying page as shown in FIG. 3. The queried order data that matches the search information only comprises one order data 1. In a case where a blank area exists on the order querying page, recommended product information (recommended products 1-4 as shown in FIG. 3) may further be presented on the order querying page.

Figure 4:
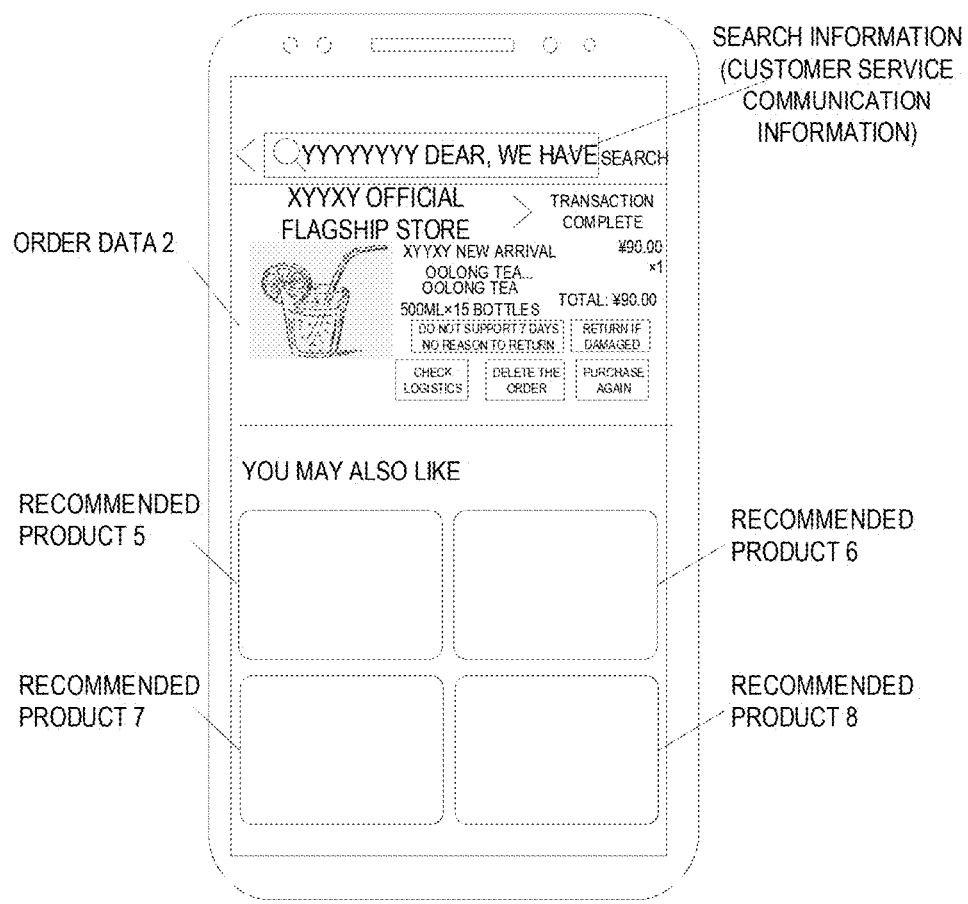
FIG. 4 shows another schematic diagram for presenting queried order data provided in the embodiments of the present disclosure.

As shown in FIG. 4, another schematic diagram for presenting the queried order data according to the embodiments of the present disclosure is provided. The search information input by a user may be customer service communication information, for example, "YYYYYYYY Dear, we have already shipped the product to you, and this is the logistics tracking number. Please remember to check it and feel free to contact us if you have any questions after receiving." After obtaining the search information, the order searching method provided in the embodiments of the present disclosure may be used to generate an order querying page as shown in FIG. 4. The queried order data that matches the search information only comprises one order data 2. Recommended product information, that is, recommended products 5-8, is also show in FIG. 4.

Figure 5:
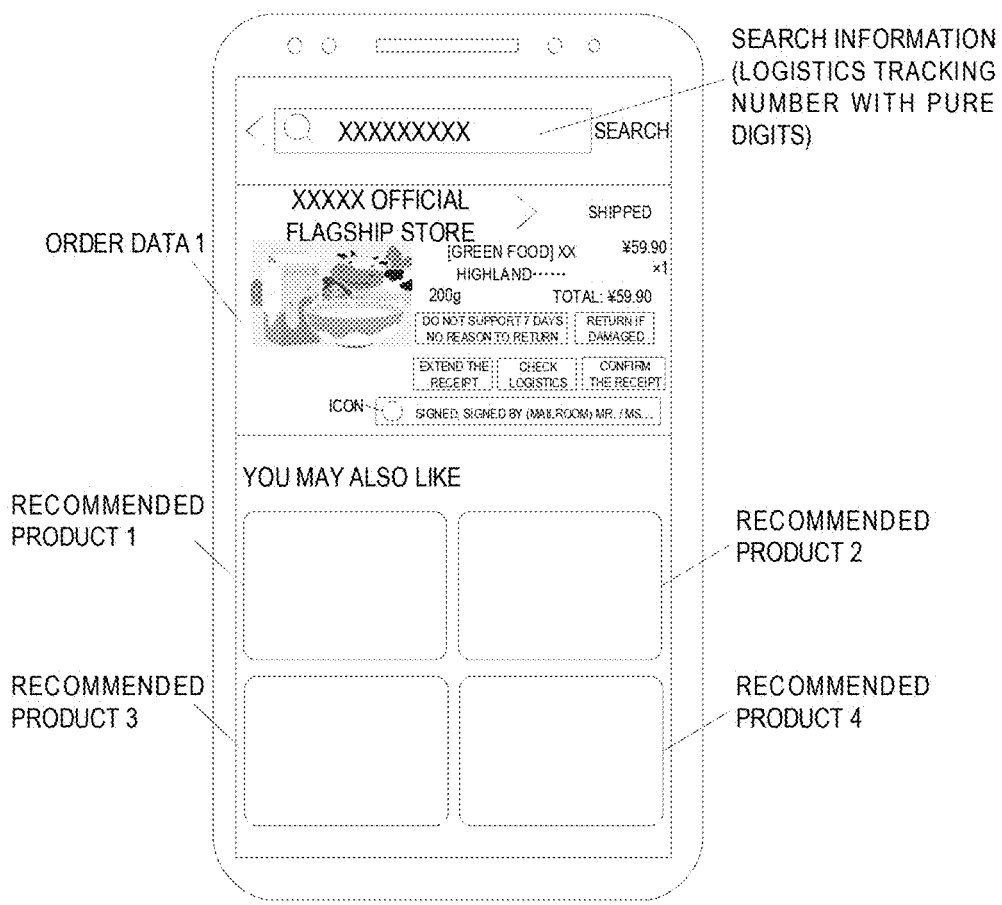
FIG. 5 shows another schematic diagram for presenting queried order data provided in the embodiments of the present disclosure.

As shown in FIG. 5, another schematic diagram for presenting the queried order data according to the embodiments of the present disclosure is provided. The search information input by a user may be a logistics tracking number with pure digits, for example, "XXXXXXXXX". After obtaining the search information, the order searching method provided by the embodiments of the present disclosure may be used to generate an order querying page as shown in FIG. 5. The queried order data that matches the search information only comprises one order data 1.

Figure 6:
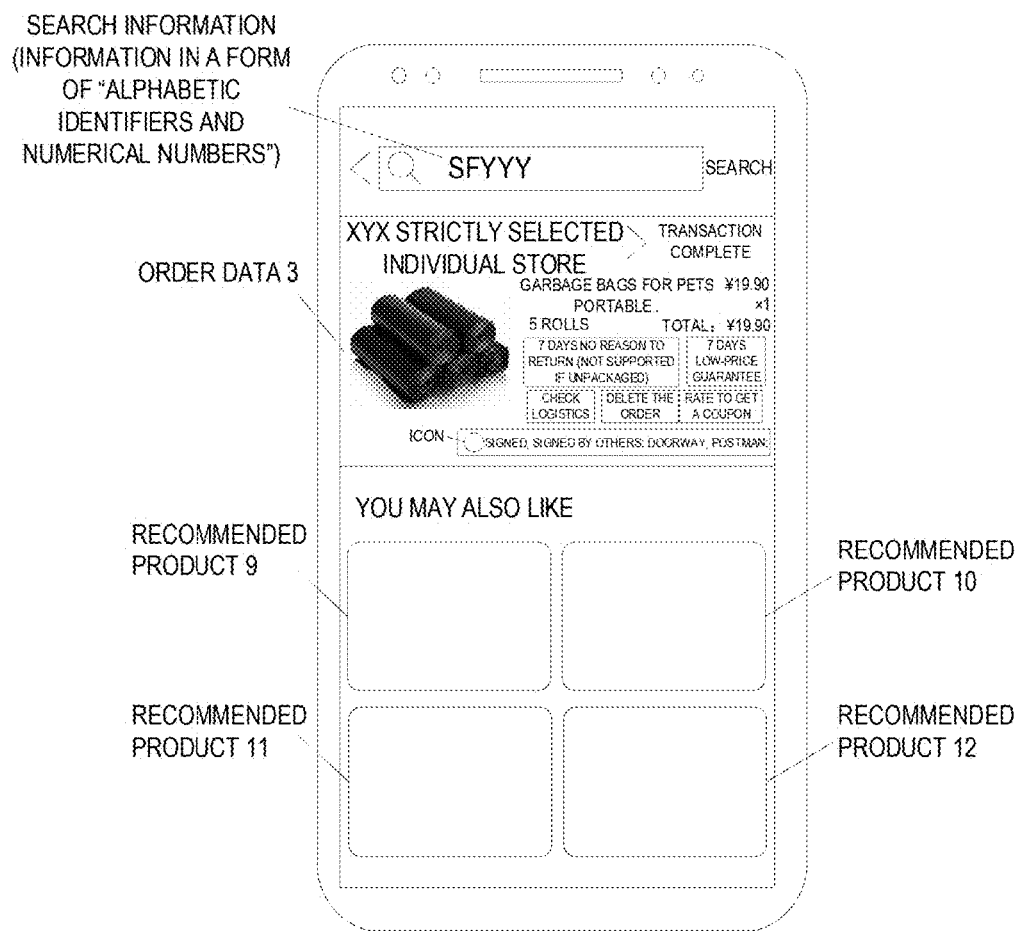
FIG. 6 shows another schematic diagram for presenting queried order data provided in the embodiments of the present disclosure.

As shown in FIG. 6, another schematic diagram for presenting the queried order data according to the embodiments of the present disclosure is provided. The search information input by a user may be in a form of "alphabetic identifiers and numerical numbers", for example, "SFYYY". After obtaining the search information, the order searching method provided by the embodiments of the present disclosure may be used to generate an order querying page as shown in FIG. 6. The queried order data that matches the search information only comprises one order data 3. Recommended product information, that is, recommended products 9-12, may be further shown in FIG. 6.

In this way, order data searching using two different databases and an order identifier may be achieved after receiving search information by maintaining a transaction database including order data and a logistics database including logistics data, and associating the two databases using order identifiers, thereby improving an order recall rate; the logistics database that comprises the logistics data is utilized for order searching, and the introduction of the logistics data facilitates accurate matching of order data that matches the search information according to the courier information and the order identifier in the logistics data, thereby improving the accuracy of recalled order data.

In one embodiment, after respective search terms corresponding to the search information are obtained using S102-1, each search term may be traversed to select a first target search term related to the logistics data from the search terms, and a second target search term related to the product attribute information may be selected from the search terms; the product attribute information comprises the store name and/or the product name.

Here, the first target search term is a search term related to the logistics data (for example, express delivery), for example, identifying the name of the logistics service provider, the logistics tracking number, or the like. The second target search term is a search term related to the store name, the product name, or the like.

As an example, the search information input by a user is "The product "XXXX" you purchased has been delivered to XX Express for transportation, with the tracking number YYYYYY Wish you a pleasant shopping experience! [XXX flagship store]". "You", "purchased", "product "XXXX"", "delivered", "XX Express", "transportation", "tracking number", "YYYYYY", "wish you a pleasant shopping experience", "XXX flagship store" and so on may be obtained by using S102-1 to segment the search information. Afterwards, it may be determined that first target search terms related to the logistics data comprise "XX Express" and "YYYYYY" and second target search terms related to the product attribute information comprise "XX Express" and "XXX flagship store" by traversing the search terms.

Alternatively, in a case where the determined first target search term comprises a search term related to the logistics tracking number information, and the first target search term comprises an alphabetic identifier and a numerical number, the first target search term may be adjusted to a first target search term with the predetermined position sorting rule according to the aforementioned step 3. Similarly, in a case where the determined first target search term comprises a search term related to the logistics description information, a target entity word identifying the logistics service provider may be selected from first target search terms according to the aforementioned step 2, and the first target search term may be updated to the selected target entity word.

Then, the target logistics tracking number that matches the search information may be queried from the logistics database according to the first target search term, and the target order identifier that matches the target logistics tracking number may be determined. Then, the first order data that matches the target order identifier may be queried from the transaction database, and the second order data that matches the search information may be queried from the transaction database according to the second target search term.

Here, the first order data may be the order data that is matched using both the logistics database and the transaction database, and the second order data may be the order data that is matched using the transaction database separately.

During a specific implementation, the obtained respective first search terms and respective logistics data maintained in the logistics database may be used to query the target logistics tracking number that matches the search information from the logistics database, and the target order identifier that matches the target logistics tracking number may be determined. Afterwards, the maintained order data and order identifiers in the transaction database may be used to query the first order data that matches the target order identifier from the transaction database. At the same time, the second target search term and respective order data stored in the transaction database may be used to query the second order data that matches the search information from the transaction database.

In one possible implementation, if the first target search term is not determined, the second order data that matches the search information may be queried from the transaction database based solely on the second target search term; on the contrary, if the second target search term is not determined, the logistics database and the transaction database may be used together to query the order data based solely on the first target search term, to obtain the first order data that matches the search information. If both the first target search term and the second target search term are not determined, it may be determined that there is an exception in this query, a null value or predetermined feedback information is returned.

For the step of "determining the first order data according to the first target search term", the following sub-steps may be implemented:

Sub-step 1: determining whether the first target search term comprises a query number related to the logistics tracking number information.

Here, the query number is a search term related to the logistics tracking number information in the first target search term.

Sub-step 2: In a case where a query number exists, querying, from respective target logistics tracking numbers stored in the logistics database, whether a matching logistics tracking number matching the query number exists.

In a specific implementation, in a case where a query number exists, an overlap degree between the query number and respective target logistics tracking numbers stored in the logistics database may be computed respectively, and then the target logistics tracking number with the overlap degree greater than or equal to a predetermined value may serve as the matching logistics tracking number. The predetermined value may be 100%, which means that the target logistics tracking number may serve as the matching logistics tracking number only in a case where numbers in the query number and the target logistic number are determined as completely consistent, and positions and orders of respective numbers are also completely consistent.

Sub-step 3: if it exists, the order identifier corresponding to the order that matches the matching number information may be served as the target order identifier, and the first order data that matches the target order identifier may be queried from the transaction database.

In another implementation, if it is determined that there is no query number, whether the first target search term comprises a query name related to the logistics description information may be further determined. If so, a similarity between each target entity word information in the logistics database and the query name may be determined, and the target entity word with a similarity greater than a first predetermined threshold may be served as a matching entity word that matches the query name; and the order identifier corresponding to the order that matches the entity word may be served as the target order identifier; and then the first order data that matches the target order identifier may be queried from the transaction database. If there is no matching entity word, it may be determined that there is no first order data.

For example, the edit distance between the target entity word and the query name may be computed, and the calculated edit distance may be served as the similarity between the target entity word and the query name.

Finally, the order data that matches the search information may be determined according to the first order data and the second order data.

As an example, the determined first order data and second order data may be directly served as order data that matches the search information.

In one embodiment, for the step of "determining order data that matches the search information according to the first order data and the second order data", the following steps may be implemented:

P1: determining an information correlation degree between the search information and each of the first order data and the second order data, respectively.

P2: order data with the information correlation degree greater than a second predetermined threshold may be served as order data that matches the search information; in a case where the correlation degree corresponding to the first order data is greater than the second predetermined threshold, the order data that matches the search information comprises the first order data. In a case where the correlation degree corresponding to the second order data is greater than the second predetermined threshold, the order data that matches the search information comprises the second order data.

As an example, for each first order data, the information correlation degree between the first order data and the search information may be determined, and in a case where the information correlation degree is greater than the second predetermined threshold, the first order data is served as the order data that matches the search information. At the same time, for each second order data, the information correlation degree between the second order data and the search information may be determined, and in a case where the information correlation degree is greater than the second predetermined threshold, the second order data is served as the order data that matches the search information.

In this way, further selecting the selected first order data and second order data may be implemented, thereby order data with a better match to the search information is queried and the accuracy of order recall is improved.

Figure 7:
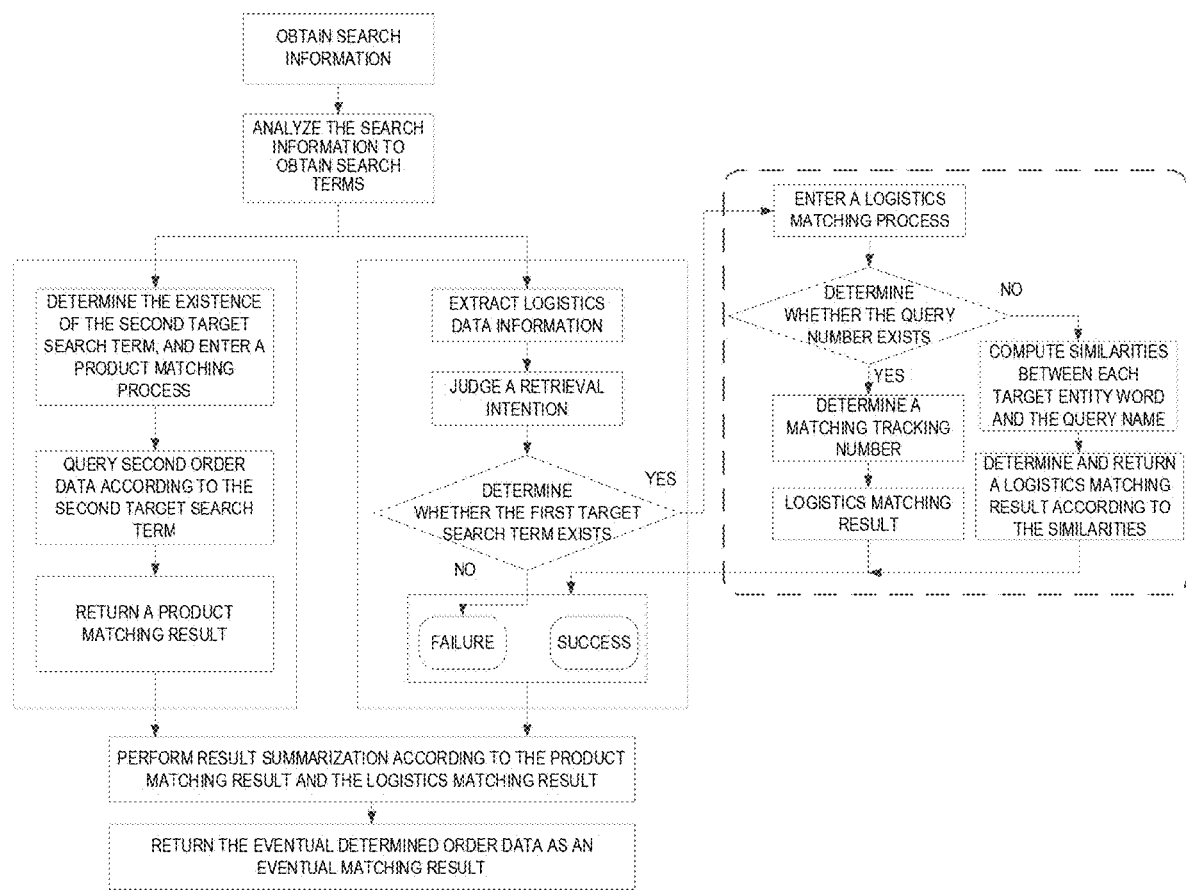
FIG. 7 shows a specific implementation flowchart of the order searching method provided in the embodiments of the present disclosure.

As shown in FIG. 7, a specific implementation flowchart of an order searching method according to the embodiments of the present disclosure may comprise the following steps: obtaining search information input by a user on the order querying page; analyzing the search information to obtain search terms, that is, performing the aforementioned S102-1. Extraction of logistics data information and extraction of product attribute information are performed synchronously; the extraction of logistics data information is to judge a retrieval intention which is to determine whether the first target search term exists in the search terms; the extraction of product attribute information is to determine whether the second target search term exists in the search terms.

In a case where the existence of the first target search term is determined, a logistics matching process may be implemented. The logistics matching process may comprise the following steps: determining whether a query number exists. If so, determining a matching logistics tracking number, and then performing the aforementioned sub-step three to obtain the first order data; returning a logistics matching result indicating successful matching, and the logistics matching result comprises the matched first order data. If there is no query number, computing the similarity between each target entity word and the query name, determining and returning the logistics matching result according to the similarity; that is, determining whether there is a matching entity word according to the similarity. If so, querying the first order data from the transaction database according to the order identifier that matches the matching entity word, and returning a logistics matching result indicating successful matching; the logistics matching result comprises the matched first order data. Otherwise, returning a logistics matching result indicating failed matching. For a specific implementation of the logistics matching process, the relevant content of the aforementioned sub-steps 1 to 3 can be referred to. When it is determined that there is no first target search term, the logistics matching process is determined to be failed, that is, it is determined that there is no first order data.

In a case where the existence of the second target search term is determined, a product matching process may be implemented. The product matching process may comprise: determining a product matching result according to the second target search term, and returning the product matching result. Determining the product matching result according to the second target search term may be: querying, from the transaction database, whether second order data matching the search information exists, if so, the product matching result may be successful matching, and the product matching result comprises the second order data. If not, the product matching result may be failed matching.

Furthermore, the results may be summarized according to the product matching result and the logistics matching result. That is, a step of determining the order data that matches the search information according to the first order data and the second order data is performed. In this way, the order data that matches the search information may be determined eventually based on the aforementioned steps, and the eventual determined order data is returned as an eventual matching result.

In one embodiment, for S103, the following steps may be implemented:

S103-1: determining, according to an order status of the order corresponding to the queried order data, target order data to be presented, wherein different order statuses correspond to different presented target order data;

S103-2: presenting the target order data.

Here, the order status is used to indicate a current transaction status of the order. For example, the order status may comprise but is not limited to a transportation status, a pending shipment status, a pending payment status, a return and exchange status, a completed status, an after-sales processing status, and a pending confirmation status.

The target order data may comprise part of the order data stored in the transaction database and part of the logistics data stored in the logistics database.

The order status may be stored in at least one of the logistics database and the transaction database, and there may be an association between the order status and the order identifier.

During a specific implementation, for queried order data that matches the search information, the order status corresponding to the order may be determined according to the order identifier corresponding to the order and the association between the order identifier and the order status. Then, the target order data to be presented corresponding to the order status may be obtained, according to the order status, from the order data corresponding to the order stored in the transaction database and the logistics data corresponding to the order stored in the logistics database. Afterwards, the target order data to be presented may be presented on the order querying page.

For example, in a case where the order status of order B is completed, the target order data to be presented may be obtained from the transaction database, including an order price, an order completion date, order gift information, product collection information, usage precautions of the product, and delivery personnel information obtained from the logistics database corresponding to the order B.

In one embodiment, in a case where the order status comprises the return and exchange status, for S103-1, the following steps may be implemented:

in a case where an order status of the order is a return and exchange status, obtaining a return and exchange logistics tracking number from the order data, and obtaining, from the logistics database, logistics status information corresponding to the return and exchange logistics tracking number.

Here, the return and exchange status may specifically comprise two types: a return status and an exchange status, and the return and exchange logistics tracking number may specifically comprise a return tracking number corresponding to the return status and an exchange tracking number corresponding to the exchange status. For an order, in a case where the return and exchange information exists, the order status of the order may be in the return and exchange status, and the order data stored in the transaction database may further comprise the corresponding return and exchange logistics tracking number.

The logistics status information is used to indicate the status of logistics, which may comprise but is not limited to a transportation status, a pending shipment status, a delivery status, a pending return and exchange status, and a return and exchange completion status.

For example, in a case where the order status of the queried order indicates a return and exchange status, the return and exchange logistics tracking number corresponding to the order may be obtained from the order data stored in the transaction database. Then, the target logistics tracking number that matches the return and exchange logistics tracking number may be determined according to the return and exchange logistics tracking number and each target logistics tracking number stored in the logistics database. Then, logistics status information may be obtained from the logistics database according to the target logistics tracking number. Finally, the return and exchange logistics tracking number and the obtained logistics status information may be served as the target order data to be presented, and the return and exchange logistics tracking number and the logistics status information may be presented to achieve the display of the target order data to be presented. In this way, flexible display of the order data may be achieved by determining the target order data to be presented through the order status.

In one embodiment, for S102, the following steps may also be implemented:

S1021: in accordance with a determination that a plurality of target logistics tracking numbers matching the search information exist in the logistics database, determining target order identifiers corresponding to the plurality of target logistics tracking numbers.

For example, if the obtained search information only comprises part of characters of the logistics tracking number or the obtained search information is the name of the logistics service provider (such as SF, EMS, XX Express, or the like), fuzzy matching may be used to query a plurality of target logistics tracking numbers matching the search information from the logistics database, and then target order identifiers corresponding to the plurality of target logistics tracking numbers may be determined, when using the search information to query the order data.

For example, in a case where the search information is "SF101", the plurality of target logistics tracking numbers queried from the logistics database may be "SF10110XXXXX", "SF101XX3XXXX", "SFX1X01XXXXX", and "SFX1X0X1XXXX". Then, the target order identifiers corresponding to these four respective target logistics tracking numbers may be obtained respectively, such as target order identifier 1, target order identifier 2, target order identifier 3, and target order identifier 4.

S1022: querying, from the transaction database, respective order data matching each target order identifier.

For example, order data 1 that matches target order identifier 1, order data 2 that matches target order identifier 2, order data 3 that matches target order identifier 3, and order data 4 that matches target order identifier 4 may be obtained from the transaction database.

Furthermore, for S103, one of the following two approaches may be used to present the plurality of queried order data:

Approach 1: sorting and presenting the plurality of queried order data.

As an example, the plurality of queried order data may be sorted according to a predetermined sorting rule, to determine the sorting order of each order data among the plurality of queried order data. Then, each queried order data may be presented on the page according to the sorting order corresponding to each order data.

In one embodiment, for the aforementioned approach 1, the plurality of queried order data may be sorted and presented in any of the following two sub-approaches:

Sub-approach 1: sorting and presenting, according to an order generation time corresponding to the respective queried order data, the respective queried order data.

As an example, the display sequence of the respective queried order data may be determined according to the order generation time corresponding to each of the plurality of queried order data, and the sequence of the order generation time. For example, the later the order generation time, the higher the display sequence of the order data. In another example, the earlier the order generation time, the higher the display sequence of the order data.

Then, the queried order data may be sorted and presented in the determined display sequence, for example, sorted and presented on the order querying page.

Taking the queried order data as an example, which comprises order data 1, order data 2, and order data 3, and the generation time of order data 1 is earlier than that of order data 3 and earlier than that of order data 2, then the display sequence may be determined as follows: order data 1 being presented at the top of the order querying page, order data 3 being presented below order data 1, and order data 2 being presented below order data 3.

Figure 8:
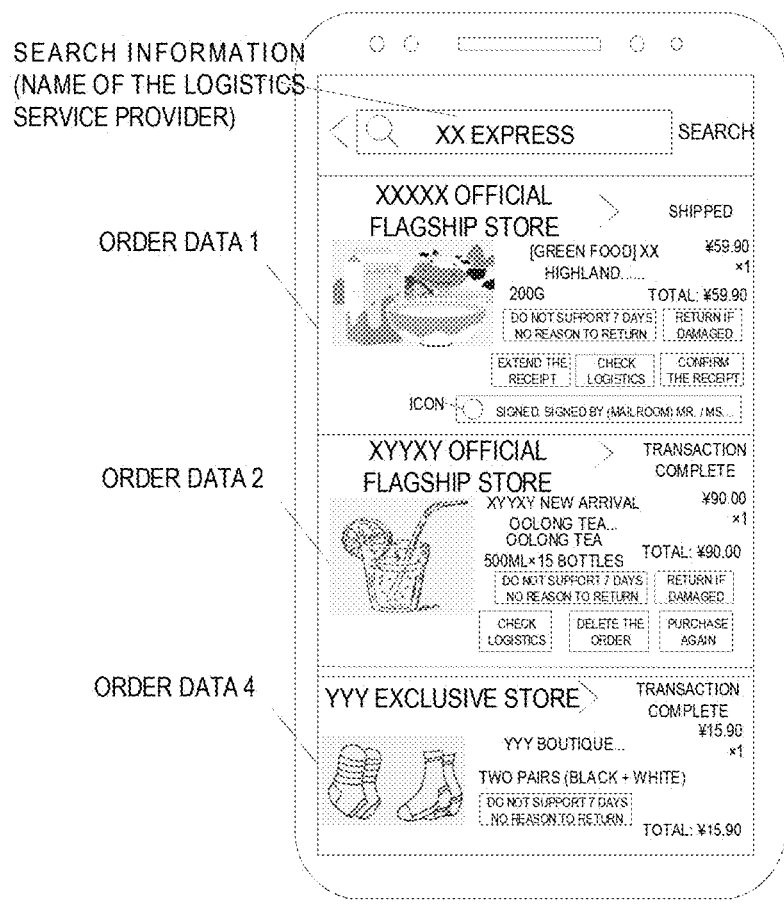
FIG. 8 shows another schematic diagram for presenting queried order data provided in the embodiments of the present disclosure.

As shown in FIG. 8, another schematic diagram for presenting the queried order data according to the embodiments of the present disclosure is provided. The search information input by a user may be the name of the logistics service provider, such as "XX Express". After obtaining the search information, the order searching method provided by the embodiments of the present disclosure may be used to generate an order querying page as shown in FIG. 8. The queried order data that matches the search information comprises order data 1, order data 2, and order data 4. The display sequence of order data 1, 2, and 4 on the order querying page is determined according to the order generation time corresponding to the three order data. In addition, in a case where a blank area does not exist on the order querying page, recommended product information will not be presented on the order querying page.

Sub-approach 2: sorting and presenting the respective queried order data according to a matching degree between the target search term and the target logistics tracking number corresponding to the respective queried order data.

In a specific implementation, for each order data among the plurality of queried order data, the edit distance between the target logistics tracking number corresponding to the order data and the target search term corresponding to the search information may be computed, and the matching degree between the target logistics tracking number and the target search term may be determined according to the computed edit distance. Then, the sorting order of respective order data may be determined according to the matching degree corresponding to the respective queried order data, and a descending order of the matching degree; that is, the higher the matching degree of order data, the higher the sorting order. Afterwards, the respective queried order data may be sorted and presented on the order querying page according to the sorting order of the respective queried order data.

Approach 2: presenting the selected order data from the plurality of queried order data.

As an example, the order description information corresponding to the plurality of queried order data may be presented to a user first. Then, in response to a selection operation of the user for any order description information, the order data corresponding to the selected order description information may be presented as the selected order data.

In one embodiment, for the aforementioned approach 2, the following steps may be implemented:
 presenting respective product category information corresponding to the plurality of order data.

During a specific implementation, for each order data in the plurality of queried order data, product category information of a product corresponding to the order data may be determined first. For example, categories of clothing, milk, beverages, books, general merchandise, food, communication tools, or the like. Afterwards, the product category information corresponding to each queried order data may be presented.

Order data matching the target product category information is presented in a search result according to selected target product category information from the plurality of product category information.

In a specific implementation, the selected product category information may be determined as the selected target product category information in response to a selection operation of a user for any presented product category information. The order data that matches the target product category information is determined and presented on the order querying page.

In one implementation, if category overlap order data corresponding to the same product category information exists in the plurality of queried order data, then the category overlap order data may correspondingly present one product category information when presenting the product category information corresponding to the order data. For example, the queried order data comprises order data A, B, C, and D. Order data A corresponds to product category information 1, order data B and order data C correspond to product category information 2, and order data D corresponds to product category information 3, then order data B and order data C are category overlap order data mutually, and only product category information 1, product category information 2, and product category information 3 may be presented when presenting the product category information. The product category information 2 corresponds to order data B and order data C.

Furthermore, if the selected target product category information is product category information 2, order data B and order data C corresponding to product category information 2 may be all presented on the order querying page. The sorting order of order data B and order data C may be determined according to the aforementioned sub-approach 1 or sub-approach 2, and sorted and presented in the determined order on the order querying page.

The skilled in the art may understand that in the aforementioned implementations, the writing order of respective steps does not imply a strict execution order or impose any limitations on the implementations. The specific execution order of each step should be determined based on its function and possible internal logic.

Based on the same inventive concept, an order searching apparatus corresponding to the order searching method is also provided in the embodiments of the present disclosure. Since the problem-solving principle of the apparatus in the embodiments of the present disclosure is similar to that of the aforementioned order searching method in the embodiments of the present disclosure, the implementation of the apparatus can refer to the implementations of the method, and the descriptions will not be repeated.

Figure 9:
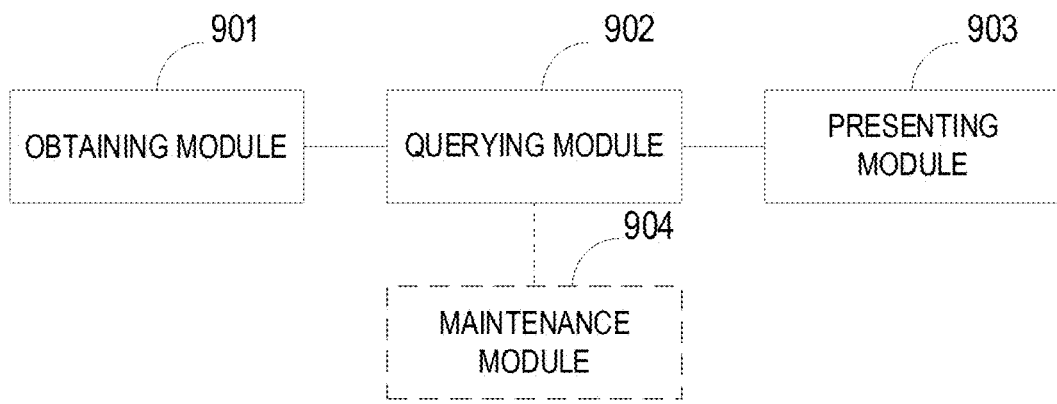
FIG. 9 shows a schematic diagram of an order searching apparatus provided in the embodiments of the present disclosure.

As shown in FIG. 9, a schematic diagram of an order searching apparatus provided in the embodiments of the present disclosure comprises:
 an obtaining module 901 configured to obtain input search information comprising keyword information representing an intention of an order query;
 a querying module 902 configured to query order data matching the search information based on a transaction database and a logistics database, wherein the transaction database comprises order data stored during order generation, and the logistics database comprises dynamically obtained logistics data of an order; the transaction data and the logistics data having a same order identifier for a same order;
a presenting module 903 configured to present the queried order data.

In a possible embodiment, the apparatus further comprises:
a maintenance module 904 configured to maintain the logistics database by:
segmenting, for each order, the dynamically obtained logistics data of the order, to obtain logistics description information and logistics tracking number information of the order;
extracting a target entity word identifying a logistics service provider from the logistics description information;
extracting an alphabetic identifier and a numerical number from the logistics tracking number information, and combining, according to a predetermined position sorting rule, the alphabetic identifier and the numerical number to obtain a target logistics tracking number;
storing, in the logistics database, the target entity word, the target logistics tracking number, and the order identifier of the order as maintained logistics data.

In a possible implementation, when querying order data matching the search information based on a transaction database and a logistics database, the querying module 902 is configured to:
segment the search information to obtain at least one search term corresponding to the search information;
traverse each of the at least one search term to select a target search term related to logistics data from the at least one search term;
query, according to the target search term, a target logistics tracking number corresponding to the search information from the logistics database, and determine a target order identifier matching the target logistics tracking number;
query, from the transaction database, order data matching the target order identifier.

In a possible implementation, when presenting the queried order data, the presenting module 903 is configured to:
determine, according to an order status of the order corresponding to the queried order data, target order data to be presented, wherein different order statuses correspond to different presented target order data;
present the target order data.

In a possible implementation, the order status comprises a return and exchange status;
when determining, according to an order status of the order corresponding to the queried order data, target order data to be presented, the presenting module 903 is configured to:
in a case where an order status of the order is a return and exchange status, obtain a return and exchange logistics tracking number from the order data, and obtain, from the logistics database, logistics status information corresponding to the return and exchange logistics tracking number;
present the return and exchange logistics tracking number and the logistics status information.

In one possible implementation, when querying order data matching the search information based on a transaction database and a logistics database, the querying module 902 is configured to:
in accordance with a determination that a plurality of target logistics tracking numbers matching the search information exist in the logistics database, determine target order identifiers corresponding to the plurality of target logistics tracking numbers;
query, from the transaction database, respective order data matching each target order identifier;
when presenting the queried order data, the presenting module 903 is configured to:
sort and present the plurality of queried order data, or present selected order data among the plurality of queried order data.

In a possible implementation, when sorting and presenting the plurality of queried order data, the presenting module 903 is configured to:
sort and present, according to an order generation time corresponding to the respective queried order data, the respective queried order data; or,
sort and present the respective queried order data according to a matching degree between the target search term and the target logistics tracking number corresponding to the respective queried order data.

In one possible implementation, when presenting selected order data among the plurality of queried order data, the presenting module is configured to:
present respective product category information corresponding to the plurality of order data;
present, in a search result, order data matching the target product category information according to selected target product category information from the plurality of product category information.

The description of the processing flow of each module in the device, as well as the interaction flow between each module, may refer to the relevant instructions in the above method embodiments, and will not be detailed here.

Figure 10:
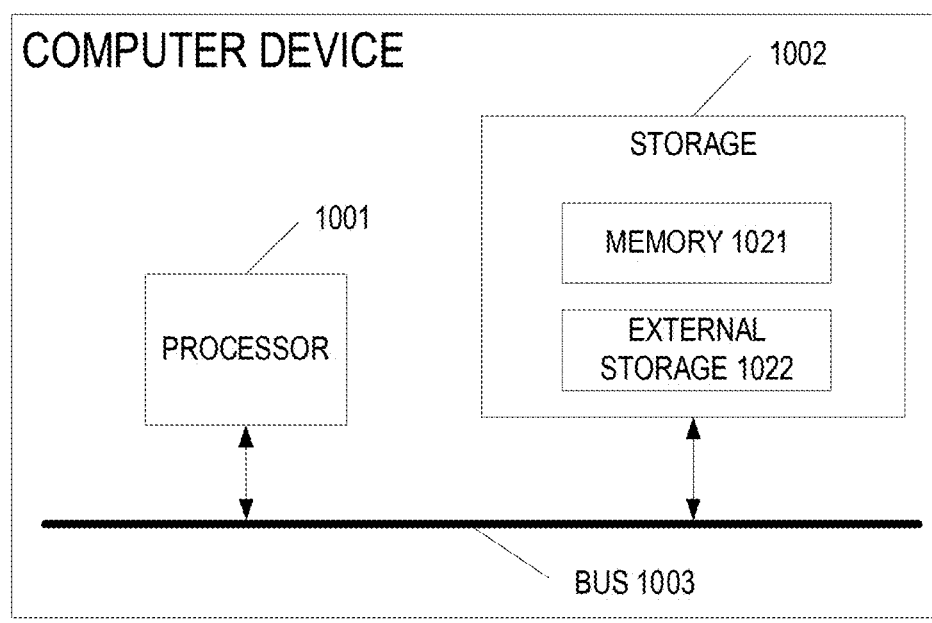
FIG. 10 shows a structural schematic diagram of a computer device provided in the embodiments of the present disclosure.

Based on the same technical concept, the embodiments of the present disclosure also provide a computer device. With reference to FIG. 10, a structural schematic diagram of a computer device provided in the embodiment of the present disclosure comprises:
a processor 1001, a storage 1002 and a bus 1003. The storage 1002 stores machine-readable instructions that can be executed by the processor 1001, the processor 1001 is used for executing the machine-readable instructions stored in the storage 1002, and when the machine-readable instructions are executed by the processor 1001, the processor 1001 performs the following steps: S101: obtaining input search information comprising keyword information representing an intention of an order query; S102: querying order data matching the search information based on a transaction database and a logistics database, wherein the transaction database comprises order data stored during order generation, and the logistics database comprises dynamically obtained logistics data of an order; the transaction data and the logistics data having a same order identifier for a same order; S103: presenting the queried order data.

The storage 1002 described above includes memory 1021 and external storage 1022. Memory 1021, also referred to herein as internal memory, is used to temporarily store computing data in processor 1001 and data exchanged with external storage 1022 such as a hard disk, and processor 1001 exchanges data with external storage 1022 through memory 1021. When the computer device operates, the processor 1001 communicates with the storage 1002 through the bus 1003, allowing the processor 1001 to execute the instructions mentioned in the above embodiment of the method.

The embodiments of the disclosure further provide a computer-readable storage medium storing a computer program to perform the steps of the order searching method, or the steps of the order searching method described in the aforementioned method embodiments when the computer program are executed by a processor. The storage medium may be a volatile or non-volatile computer readable storage medium.

The computer program product of an order searching method provided by embodiments of the disclosure comprises a computer readable storage medium on which program code is stored, the program code comprising instructions that can be used to perform the steps of the order searching method described in the aforementioned method embodiments. Specific details can be found in the aforementioned method embodiments and will not be repeated here.

The computer program product may be specifically implemented by means of hardware, software, or a combination thereof. In one embodiment, the computer program product is embodied specifically as a computer storage medium. And in another embodiment, the computer program product is embodied specifically as a software product, such as a Software Development Kit (SDK), and the like.

It will be clear to those skilled in the art that, for ease and brevity of description, the specific processes of operation of the systems and apparatus described above may be referred to the corresponding processes in the preceding method embodiments and will not be repeated herein. In the several embodiments provided by the disclosure, it should be understood that the disclosed systems, devices and methods, can be implemented in other ways. The embodiments of the devices described above are merely schematic, for example, the division of the units described, which is only a logical functional division, can be divided in another way when actually implemented, and also, for example, multiple units or components can be combined or can be integrated into another system, or some features can be ignored, or not implemented. And the mutual coupling or direct coupling or communication connection shown or discussed can be indirect coupling or communication connection through some communication interface, device or unit, which can be electrical, mechanical or other forms.

The units illustrated as separate components may or may not be physically separate, and the components displayed as units may or may not be physical units, i.e., they may be located in one place or may be distributed to multiple network units. Some or all of these units may be selected according to practical needs to achieve the purpose of this embodiment solution.

Alternatively, each functional unit in various embodiments of the disclosure may be integrated in a single processing unit, or the individual units may be physically present separately, or two or more units may be integrated in a single unit.

The described functionality, when implemented in the form of a software functional unit and sold or used as a separate product, may be stored in a processor-executable, non-volatile computer readable storage medium. It is understood that the technical solutions of the disclosure, or portions of the technical solutions, that essentially contribute to the prior art may be embodied in the form of a software product stored in a storage medium comprising a number of instructions to cause a computing device (which may be a personal computer, a server, or a network device, etc.) to perform all or some of the steps of the methods described in various embodiments of the disclosure. The aforementioned storage media includes: USB flash drives, removable hard drives, Read-Only Memory (ROM), Random Access Memory (RAM), disks, or CD-ROMs, and other media that can store program code.

If the technical solution of the present disclosure involves personal information, the product applying the technical solution of the present disclosure has clearly informed the personal information processing rules and obtained personal independent consent before processing personal information. If the technical solution of the present disclosure involves sensitive personal information, the product applying the technical solution of the present disclosure has obtained individual consent before processing sensitive personal information, and at the same time meets the requirement of "express consent". For example, at personal information collection devices such as cameras, clear and prominent signs are set up to inform individuals that they have input the personal information collection range, and personal information will be collected. If an individual voluntarily enters the collection range, it is considered that they agree to collect their personal information; Alternatively, on personal information processing devices, by using clear signs/information to inform personal information processing rules, personal authorization may be obtained through pop-up messages or by asking individuals to upload their personal information themselves; personal information processing rules may comprise personal information processors, personal information processing purposes, processing methods, types of personal information processed, and other information.

Finally, it should be noted that the above embodiments are only specific embodiments of the disclosure to illustrate the technical solutions of the disclosure and not to limit the scope of protection of the disclosure, which is not limited thereto. Despite the detailed description of the disclosure with reference to the foregoing embodiments, it should be understood by those of ordinary skill in the art that any person skilled in the art may still modify or readily conceive of changes to the technical solutions described in the foregoing embodiments, or make equivalent substitutions for some of the technical features thereof, within the scope of the technology disclosed in the disclosure. These modifications, changes or replacements do not make the essence of the corresponding technical solutions out of the spirit and scope of the technical solutions of the embodiments of the disclosure, and shall all be covered by the scope of protection of the disclosure. Therefore, the scope of protection of the disclosure shall be stated to be subject to the scope of protection of the claims.

What is claimed is:
1. An order searching method, comprising:
obtaining input search information comprising keyword information representing an intention of an order query;
querying order data matching the search information based on a transaction database and a logistics database, wherein the transaction database comprises order data stored during order generation, and the logistics database comprises dynamically obtained logistics data of an order; the transaction data and the logistics data having a same order identifier for a same order; and
presenting the queried order data, wherein the logistics database is maintained by:
> segmenting, for each order, the dynamically obtained logistics data of the order, to obtain logistics description information and logistics tracking number information of the order;
> extracting a target entity word identifying a logistics service provider from the logistics description information;
> extracting an alphabetic identifier and a numerical number from the logistics tracking number information, and combining, according to a predetermined position sorting rule, the alphabetic identifier and the numerical number to obtain a target logistics tracking number; and
> storing, in the logistics database, the target entity word, the target logistics tracking number, and the order identifier of the order as maintained logistics data.

2. The method of claim 1, wherein the querying order data matching the search information based on a transaction database and a logistics database comprises:
> segmenting the search information to obtain at least one search term corresponding to the search information;
> traversing each of the at least one search term to select a target search term related to logistics data from the at least one search term;
> querying, according to the target search term, a target logistics tracking number corresponding to the search information from the logistics database, and determining a target order identifier matching the target logistics tracking number;
> querying, from the transaction database, order data matching the target order identifier.

3. The method of claim 1, wherein the presenting the queried order data comprises:
> determining, according to an order status of the order corresponding to the queried order data, target order data to be presented, wherein different order statuses correspond to different presented target order data;
> presenting the target order data.

4. The method of claim 3, wherein the order status comprises a return and exchange status;
> the determining, according to an order status of the order corresponding to the queried order data, target order data to be presented comprising:
> in a case where an order status of the order is a return and exchange status, obtaining a return and exchange logistics tracking number from the order data, and obtaining, from the logistics database, logistics status information corresponding to the return and exchange logistics tracking number;
> presenting the return and exchange logistics tracking number and the logistics status information.

5. The method of claim 1, wherein the querying order data matching the search information based on a transaction database and a logistics database comprises:
> in accordance with a determination that a plurality of target logistics tracking numbers matching the search information exist in the logistics database, determining target order identifiers corresponding to the plurality of target logistics tracking numbers;
> querying, from the transaction database, respective order data matching each target order identifier;
> the presenting the queried order data comprising:
> sorting and presenting the plurality of queried order data, or presenting selected order data among the plurality of queried order data.

6. The method of claim 5, wherein the sorting and presenting the plurality of queried order data comprises:
> sorting and presenting, according to an order generation time corresponding to the respective queried order data, the respective queried order data; or,
> sorting and presenting the respective queried order data according to a matching degree between the target search term and the target logistics tracking number corresponding to the respective queried order data.

7. The method of claim 5, wherein the presenting selected order data among the plurality of queried order data comprises:
> presenting respective product category information corresponding to the plurality of order data;
> presenting, in a search result, order data matching the target product category information according to selected target product category information from the plurality of product category information.

8. A computer device, comprising: a processor and a memory storing machine readable instructions executable by the processor, the machine-readable instructions, when executed by the processor, causing the processor to perform an order searching method, the method comprising following acts of:
> obtaining input search information comprising keyword information representing an intention of an order query;
> querying order data matching the search information based on a transaction database and a logistics database, wherein the transaction database comprises order data stored during order generation, and the logistics database comprises dynamically obtained logistics data of an order; the transaction data and the logistics data having a same order identifier for a same order; and
> presenting the queried order data,
> wherein the logistics database is maintained by:
> segmenting, for each order, the dynamically obtained logistics data of the order, to obtain logistics description information and logistics tracking number information of the order;
> extracting a target entity word identifying a logistics service provider from the logistics description information;
> extracting an alphabetic identifier and a numerical number from the logistics tracking number information, and combining, according to a predetermined position sorting rule, the alphabetic identifier and the numerical number to obtain a target logistics tracking number; and
> storing, in the logistics database, the target entity word, the target logistics tracking number, and the order identifier of the order as maintained logistics data.

9. The computer device of claim 8, wherein the querying order data matching the search information based on a transaction database and a logistics database comprises:
> segmenting the search information to obtain at least one search term corresponding to the search information;
> traversing each of the at least one search term to select a target search term related to logistics data from the at least one search term;
> querying, according to the target search term, a target logistics tracking number corresponding to the search information from the logistics database, and determining a target order identifier matching the target logistics tracking number;
> querying, from the transaction database, order data matching the target order identifier.

10. The computer device of claim 8, wherein the presenting the queried order data comprises:
- determining, according to an order status of the order corresponding to the queried order data, target order data to be presented, wherein different order statuses correspond to different presented target order data;
- presenting the target order data.

11. The computer device of claim 10, wherein the order status comprises a return and exchange status;
- the determining, according to an order status of the order corresponding to the queried order data, target order data to be presented comprising:
- in a case where an order status of the order is a return and exchange status, obtaining a return and exchange logistics tracking number from the order data, and obtaining, from the logistics database, logistics status information corresponding to the return and exchange logistics tracking number;
- presenting the return and exchange logistics tracking number and the logistics status information.

12. The computer device of claim 8, wherein the querying order data matching the search information based on a transaction database and a logistics database comprises:
- in accordance with a determination that a plurality of target logistics tracking numbers matching the search information exist in the logistics database, determining target order identifiers corresponding to the plurality of target logistics tracking numbers;
- querying, from the transaction database, respective order data matching each target order identifier;
- the presenting the queried order data comprising:
- sorting and presenting the plurality of queried order data, or presenting selected order data among the plurality of queried order data.

13. The computer device of claim 12, wherein the sorting and presenting the plurality of queried order data comprises:
- sorting and presenting, according to an order generation time corresponding to the respective queried order data, the respective queried order data; or,
- sorting and presenting the respective queried order data according to a matching degree between the target search term and the target logistics tracking number corresponding to the respective queried order data.

14. The computer device of claim 12, wherein the presenting selected order data among the plurality of queried order data comprises:
- presenting respective product category information corresponding to the plurality of order data;
- presenting, in a search result, order data matching the target product category information according to selected target product category information from the plurality of product category information.

15. A non-transitory computer-readable storage medium having a computer program stored thereon which, when executed by a computer device, performs an order searching method, the method comprising following acts of:
- obtaining input search information comprising keyword information representing an intention of an order query;
- querying order data matching the search information based on a transaction database and a logistics database, wherein the transaction database comprises order data stored during order generation, and the logistics database comprises dynamically obtained logistics data of an order; the transaction data and the logistics data having a same order identifier for a same order; and
- presenting the queried order data,
- wherein the logistics database is maintained by:
  - segmenting, for each order, the dynamically obtained logistics data of the order, to obtain logistics description information and logistics tracking number information of the order;
  - extracting a target entity word identifying a logistics service provider from the logistics description information;
  - extracting an alphabetic identifier and a numerical number from the logistics tracking number information, and combining, according to a predetermined position sorting rule, the alphabetic identifier and the numerical number to obtain a target logistics tracking number; and
  - storing, in the logistics database, the target entity word, the target logistics tracking number, and the order identifier of the order as maintained logistics data.

16. The storage medium of claim 15, wherein the querying order data matching the search information based on a transaction database and a logistics database comprises:
- segmenting the search information to obtain at least one search term corresponding to the search information;
- traversing each of the at least one search term to select a target search term related to logistics data from the at least one search term;
- querying, according to the target search term, a target logistics tracking number corresponding to the search information from the logistics database, and determining a target order identifier matching the target logistics tracking number;
- querying, from the transaction database, order data matching the target order identifier.

17. The storage medium of claim 15, wherein the presenting the queried order data comprises:
- determining, according to an order status of the order corresponding to the queried order data, target order data to be presented, wherein different order statuses correspond to different presented target order data;
- presenting the target order data.

\* \* \* \* \*